United States Patent
Singleton et al.

(10) Patent No.: US 10,147,447 B2
(45) Date of Patent: Dec. 4, 2018

(54) MAGNETIC ELEMENT WITH REDUCED SHIELD-TO-SHIELD SPACING

(71) Applicant: SEAGATE TECHNOLOGY LLC, Cupertino, CA (US)

(72) Inventors: Eric Walter Singleton, Maple Plain, MN (US); Zhiguo Ge, Lakeville, MN (US); Shaun Eric McKinlay, Eden Prairie, MN (US); Jae-Young Yi, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 104 days.

(21) Appl. No.: 15/072,489

(22) Filed: Mar. 17, 2016

(65) Prior Publication Data

US 2016/0196840 A1    Jul. 7, 2016

Related U.S. Application Data

(62) Division of application No. 13/956,912, filed on Aug. 1, 2013, now Pat. No. 9,305,578.

(51) Int. Cl.
| | |
|---|---|
| *B44C 1/22* | (2006.01) |
| *G11B 5/31* | (2006.01) |
| *G11B 5/39* | (2006.01) |

(52) U.S. Cl.
CPC ............ *G11B 5/3163* (2013.01); *G11B 5/398* (2013.01); *G11B 5/3912* (2013.01); *G11B 5/3932* (2013.01)

(58) Field of Classification Search
CPC .................................................. G11B 5/3163
See application file for complete search history.

(56) References Cited

U.S. PATENT DOCUMENTS

| | | | |
|---|---|---|---|
| 8,259,540 B1 | 9/2012 | Sahoo | |
| 8,391,106 B2 | 3/2013 | Shimazawa | |
| 8,585,249 B2 | 11/2013 | Sapozhnikov | |
| 8,711,528 B1 | 4/2014 | Xiao | |
| 8,953,286 B2 | 2/2015 | Hase | |
| 8,970,993 B2 | 3/2015 | Iwasaki | |
| 9,013,837 B2 | 4/2015 | Hase | |
| 9,034,149 B2 * | 5/2015 | Zheng | C23C 14/025 204/192.2 |
| 9,042,062 B2 | 5/2015 | Hong | |
| 9,196,270 B1 * | 11/2015 | Yang | G11B 5/39 |
| 2004/0207960 A1 | 10/2004 | Saito | |

(Continued)

OTHER PUBLICATIONS

"Antiferromagnetism", web page, no date.*

*Primary Examiner* — Thomas T Pham
(74) *Attorney, Agent, or Firm* — Mueting, Raasch & Gebhardt, P.A.

(57) ABSTRACT

A magnetic stack is disclosed. The magnetic stack includes a magnetically responsive lamination that includes a ferromagnetic free layer, a synthetic antiferromagnetic (SAF) structure, and a spacer layer positioned between the ferromagnetic free layer and the SAF structure. The magnetically responsive lamination is separated from a sensed data bit stored in an adjacent medium by an air bearing surface (ABS). The stack also includes a first antiferromagnetic (AFM) structure coupled to the SAF structure a predetermined offset distance from the ABS, and a second AFM structure that is separated from the first AFM structure by a first shield layer.

20 Claims, 7 Drawing Sheets

(56) References Cited

U.S. PATENT DOCUMENTS

| | | |
|---|---|---|
| 2004/0207962 A1 | 10/2004 | Saito |
| 2005/0270703 A1* | 12/2005 | Hayakawa ............... G11B 5/39 |
| | | 360/324.1 |
| 2009/0086385 A1* | 4/2009 | Gill ....................... B82Y 10/00 |
| | | 360/324.11 |
| 2010/0232072 A1 | 9/2010 | Dimitrov |
| 2012/0134057 A1 | 5/2012 | Song |
| 2012/0276415 A1 | 11/2012 | Sapozhnikov |
| 2014/0133052 A1 | 5/2014 | Meguro |
| 2014/0334032 A1* | 11/2014 | Nishioka ............... G11B 5/127 |
| | | 360/75 |

* cited by examiner

MAGNETIC ELEMENT WITH REDUCED SHIELD-TO-SHIELD SPACING

CROSS REFERENCE TO RELATED APPLICATION

This application is a divisional of U.S. application Ser. No. 13/956,912, filed Aug. 1, 2013, the disclosure of which is incorporated herein by reference thereto.

SUMMARY

In one aspect, the present disclosure provides a magnetic stack that includes a magnetically responsive lamination. The magnetically responsive lamination includes a ferromagnetic free layer, a synthetic antiferromagnetic (SAF) structure, and a spacer layer positioned between the ferromagnetic free layer and the SAF structure, where the magnetically responsive lamination is separated from a sensed data bit stored in an adjacent medium by an air bearing surface (ABS). The stack further includes a first antiferromagnetic (AFM) structure coupled to the SAF structure a predetermined offset distance from the ABS, and a second AFM structure separated from the first AFM structure by a first shield layer.

In another aspect, the present disclosure provides a method of forming a magnetic stack. The method includes forming a shield layer; forming an AFM structure proximate the shield layer; and forming an SAF structure proximate the AFM structure, where the SAF structure includes a pinned layer proximate the AFM structure and coupled to the AFM structure. The method further includes selectively removing a portion of the pinned layer and AFM structure in a region of the magnetic stack to expose a portion of the shield layer proximate the region; and depositing shield material in the region of the magnetic stack, where the shield material is coupled to the shield layer. The method further includes depositing pinned layer material on the shield material proximate the pinned layer; and forming a magnetically responsive lamination proximate the SAF structure.

In another aspect, the present disclosure provides a magnetic stack that includes a magnetically responsive lamination. The magnetically responsive lamination includes a ferromagnetic free layer, an SAF structure, and a spacer layer positioned between the ferromagnetic free layer and the SAF structure, where the magnetically responsive lamination is separated from a sensed data bit stored in an adjacent medium by an ABS. The stack further includes an AFM structure coupled to the SAF structure a predetermined offset distance from the ABS; and a first shield layer proximate the AFM structure such that the AFM structure is between at least a portion of the first shield layer and the SAF structure. The SAF structure includes a pinned layer that is coupled to the first shield layer.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
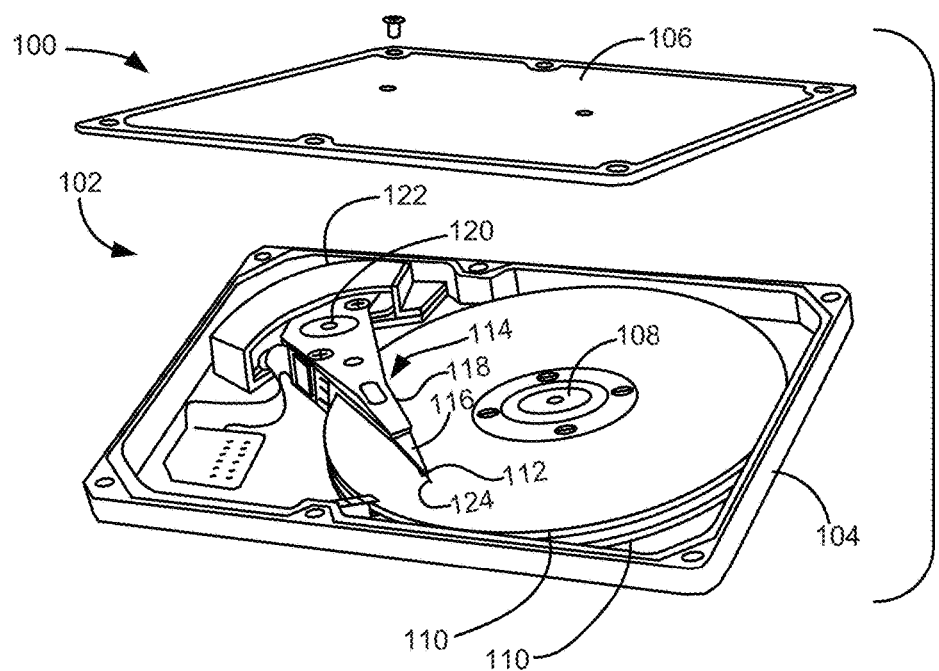
FIG. 1 is a schematic perspective view of one embodiment of a data storage device.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

The present disclosure generally relates to magnetic elements or stacks capable of detecting magnetic fluctuations, e.g., stacks that can be used as read sensors in data transducing heads and magnetic memory elements used to provide non-volatile storage of data. The areal density of a data storage device has become more important as data storage capacity increases. Raising the areal density of a device corresponds to smaller reading components and more data bits for a given area. A reduction in the size of a data reader, however, can lead to magnetic instability and inaccurate data sensing through the presence of noise and poor cross-track resolution.

Currently, these magnetic elements include an antiferromagnetic (AFM) structure and a synthetic antiferromagnetic (SAF) structure formed on the AFM structure. The AFM and SAF structures are coupled to each other through interfacial exchange coupling, thereby stabilizing reference layers of the sensor. The reference layers preferably maintain their magnetization in the presence of a magnetic field produced by magnetic media.

A tunnel barrier and free layer are then deposited on the reference layers. The free layer can respond to the media field. The magnitude of the tunneling conductance between the free layer and the reference layers depends on the relative direction between the magnetization in the reference layers and the free layer. The magnetic state of the magnetic media can be read based upon this change in tunneling conductance.

In at least some current designs of magnetic sensors, all of these layers typically extend to an air bearing surface (ABS). It may be beneficial for the free layer to extend to the ABS as the media's magnetic field decays with head-media spacing (HMS). An AFM structure that extends to the ABS, however, adds to the shield-to-shield spacing (SSS) and thereby increases the physical and magnetic thickness of the magnetic stack. By recessing the AFM structure from the ABS, the SSS will be reduced while the SAF structure can remained "pinned" in its magnetic state.

Accordingly, various embodiments of the present disclosure are generally directed to a magnetically responsive lamination that includes a ferromagnetic free layer, an SAF structure, and a spacer layer positioned between the ferromagnetic free layer and the SAF structure. The lamination is separated from a sensed data bit stored in an adjacent medium by an ABS. The SAF structure is coupled to an AFM structure a predetermined offset distance from the ABS. Such position of the AFM structure that is offset from an ABS can allow for a smaller shield-to-shield spacing that corresponds to increased areal density capability and accurate data sensing.

In some embodiments, the stack includes a second AFM structure separated from the first AFM structure by a shield layer. In some embodiments, the pinned layer is also coupled to a shield layer, which may further stabilize the magnetic properties of the SAF structure.

An example of a data storage device 100 is provided in FIG. 1. The device 100 shows a non-limiting environment in which various embodiments of the present disclosure can be practiced. The device 100 includes a substantially sealed housing 102 formed from a base deck 104 and top cover 106. An internally disposed spindle motor 108 is configured to rotate a number of magnetic storage media 110. The media 110 are accessed by a corresponding array of data transducers (read/write heads) that are each supported by a head gimbal assembly (HGA) 112.

Each HGA 112 can be supported by a head-stack assembly 114 ("actuator") that includes a flexible suspension 116, which in turn is supported by a rigid actuator arm 118. The actuator 114 preferably pivots about a cartridge bearing assembly 120 through application of current to a voice coil motor (VCM) 122. In this way, controlled operation of the VCM 122 causes the transducers (numerically denoted at 124) to align with tracks (not shown) defined on the media surfaces to store data thereto or retrieve data therefrom.

Figure 2:
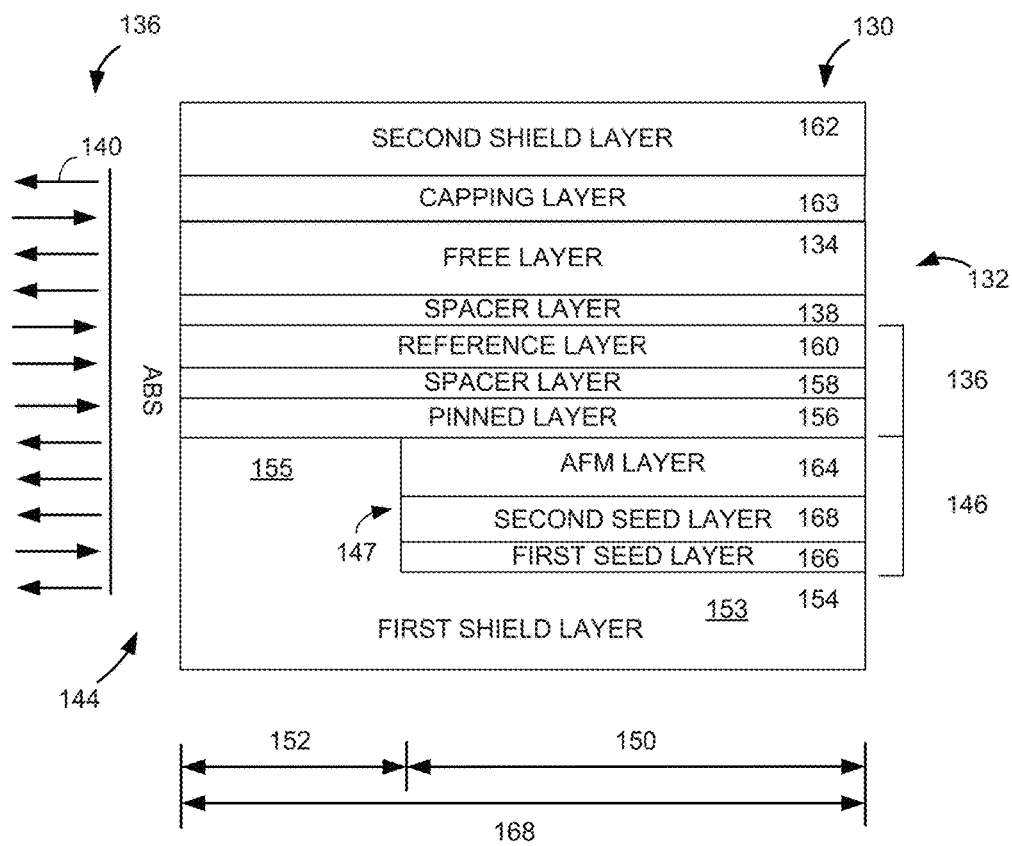
FIG. 2 is a schematic cross-section view of one embodiment of a magnetic stack.

FIG. 2 is a schematic cross-section view of one embodiment of a magnetic stack 130 capable of being used as a read sensor in the data transducers 124 of FIG. 1. The stack 130 includes a magnetically responsive lamination 132 that includes a ferromagnetic free layer 134, an SAF structure 136, and a spacer layer 138 positioned between the free layer and the SAF structure. In some embodiments, the magnetically responsive lamination 132 can include any suitable layer or layers.

The magnetically responsive lamination 132 is separated from a sensed data bit 140 stored in an adjacent medium 136 by an air bearing surface 144. The stack 130 also includes an AFM structure 146 that is coupled to the SAF structure 136 by a predetermined offset distance 152 from the ABS 144. The stack 130 also includes a first shield layer 154 proximate the AFM structure 146 such that the structure is between at least a portion of the first shield layer and the SAF structure 136.

In the illustrated embodiment, the magnetically responsive lamination 132 includes the free layer 134 that can be sensitive to external magnetic fields. That is, the free layer 134 can have a magnetization that corresponds to an encountered external magnetic field, such as provided by programmed magnetic bits 140 on the adjacent storage medium 136. The free layer 134 can include any suitable material or materials, e.g., NiFe, CoFe, CoNiFe, CoFeB, magnetic Heusler alloys, etc.

The SAF structure 136 of the lamination 132 is separated from the free layer 134 by spacer layer 138. The SAF structure 136 can have a predetermined set magnetization. In the embodiment illustrated in FIG. 2, the SAF structure 136 includes a reference layer 160, and a non-magnetic spacer layer 158 positioned between the reference layer and a pinned layer 156, where the pinned layer is proximate the AFM structure 146 and coupled to the AFM structure and the first shield layer 154. In other embodiments, the SAF structure 136 can include any suitable layer or layers. For example, the SAF structure 136 can include a lamination of a transition metal, such as Ru, disposed between ferromagnetic crystalline or amorphous sub-layers, such as metals like Ni and Co, alloys like CoFe and NiFe, and high polarization ratio compounds like CoFeB. The reference layer 160 can include any suitable material or materials, e.g., CoFe, CoFeB, etc.

The spacer layer 158 can include any suitable material or materials, e.g., Ru, and can have any suitable thickness to accommodate free layer magnetic sensing.

The free layer 134 and SAF structure 136 can each be coupled to an electrode layer, e.g., one or more seed layers, cap layers, etc., that provide both manufacturing and operational improvements. For example, the free layer 134 can be coupled to optional capping layer 163. It should be noted, however, that the composition, shape, and placement of the electrode layers are not limited and can be modified or removed.

The pinned layer 156 is positioned between the spacer layer 158 and the AFM structure 146. In some embodiments, the pinned layer 156 is coupled to the AFM structure 146. Further, in some embodiments, the pinned layer 156 can be coupled to the first shield layer 154. The pinned layer 156 can include any suitable stripe height 168. In some embodiments, the pinned layer 156 extends to the ABS 144. In other embodiments, the pinned layer 156 is recessed any suitable distance from the ABS 144.

The pinned layer 156 can include any suitable material or materials, e.g., Co, CoFe, CoFeB, etc.

Positioned between the free layer 134 and the SAF structure 136 is the spacer layer 138. The spacer layer 138 can include any suitable material or materials, e.g., Co, Ag, MgO, TiO, $Al_2O_3$, etc. In some embodiments, the spacer layer 138 can include the same material as the spacer layer 158.

In the embodiment illustrated in FIG. 2, the SAF structure 136, free layer 134, and spacer layer 138 each extends to the ABS 144, e.g., stripe height 168. In other embodiments, one or more of these structures and layers may not extend to the ABS 144.

Coupled to the SAF structure 136 is the AFM structure 146, which, in the illustrated embodiment, includes an AFM layer 164, a first seed layer 166, and a second seed layer 168 positioned between the AFM layer and the first seed layer. In some embodiments, the AFM layer 164 is coupled to the pinned layer 156 of the SAF structure 136. The AFM layer 164 can include any suitable material or materials, e.g., IrMn, PtMn, NiMn, IrMnCr, PtMnCr, etc.

The first and second seed layers 166, 168 can include any suitable material or materials, e.g., Ta, Ru, NiFeW, NiFeNb, CoNiFeW, CoNiFeNb, CoFeNb, CoFeW, etc.

While the AFM structure 146 can, in some embodiments, be attached anywhere along the SAF structure 136, the addition of an AFM structure at the ABS would increase the distance between shields 154 and 162 (i.e., shield-to-shield spacing), thus limiting the maximum potential areal density readable by the stack 130. It has been observed that the AFM structure 146 can provide acceptable levels of exchange coupling to maintain the set magnetization of the pinned layer 156 with a length 150 that is less than the stripe height 168. In other words, in some embodiments, the AFM structure 146 does not extend to the ABS 144. And the operational characteristics of the magnetic stack can be adjusted and tuned by varying the size, shape, and position of the AFM structure 146 on the SAF structure 136.

The AFM structure 146 can take any suitable shape. For example, in the embodiment illustrated in FIG. 2, the AFM structure 146 includes a surface 147 that is substantially parallel to the ABS 144. In other embodiments, surface 147 can be anti-parallel to the ABS 144. For example, the surface 147 can be sloped in relation to the ABS 144, e.g., AFM structure 224 of FIGS. 4A-F.

The addition of the AFM structure 146 to the magnetic stack 130 can provide increased performance with robustness against operational variability. That the AFM structure 146 is complementing the existing set magnetization of the SAF structure 136 can allow for the reduced length 150 to complement the SAF structure 136 without having to impart and maintain the set magnetization in response to the external bits 140. As such, the AFM structure 146, in some embodiments, is coupled directly to the pinned layer 156, as opposed to attaching the AFM structure onto the free layer 134, which could impart a bias magnetization onto the free layer.

In some embodiments, the magnetic stack 130 also includes a first shield layer 154 proximate the AFM structure 146 such that the AFM structure is between at least a portion of the first shield layer and the SAF structure 136. Specifically, a first region 153 of the first shield layer 154 is proximate the AFM structure 146 such that the structure is between the first region and the SAF structure. In other words, the first shield layer 154 includes a region of reduced thickness that house a portion of the AFM structure 146, e.g., first region 153. As can be seen in FIG. 2, a second region 155 of the first shield layer 154 is proximate the SAF structure 136 such that the pinned layer 156 of the SAF structure is coupled to the first shield layer 154.

In some embodiments, the magnetic stack 130 can include a second magnetic shield layer 162 proximate the magnetically responsive lamination 132. The first and second magnetic shield layers 154, 162, can include any suitable material or materials, e.g., NiFe, CoNiFe, etc. In some embodiments, the first shield layer 154 and second shield layer 162 can include the same materials; in other embodiments, the first shield layer includes material or materials that are different from the material or materials of the second shield layer.

In general, the shield layers 154, 162 can be oriented in a variety of configurations and include a variety of compositions to direct unwanted magnetic flux away from the magnetic lamination of the free layer 134 and SAF structure 136. Such shielding can allow for improved magnetic sensing of programmed bits 140 from medium 136 by eliminating noise and inadvertent sensing of adjacent bits.

The stack 130 can also include an optional capping layer 163 positioned between the second shield layer 162 and the free layer 134. The capping layer 163, which can in some embodiments function as an electrode, can include any suitable material or materials.

Although the magnetic stack 130 of FIG. 2 includes a single AFM structure 146, other embodiments can include two or more AFM structures. Such additional AFM structures can be utilized to pin the magnetization of a shield layer. It has been observed that the rotation of magnetization of a pinned bottom shield, for example, in the opposite direction to that of the free layer (e.g., free layer 134 of FIG. 2), with a phase shift, can help to further reduce the magnetic thickness, thereby improving magnetic resolution of the magnetic stack. The reduced physical thickness of the stack can also further increase resolution.

Figure 3:
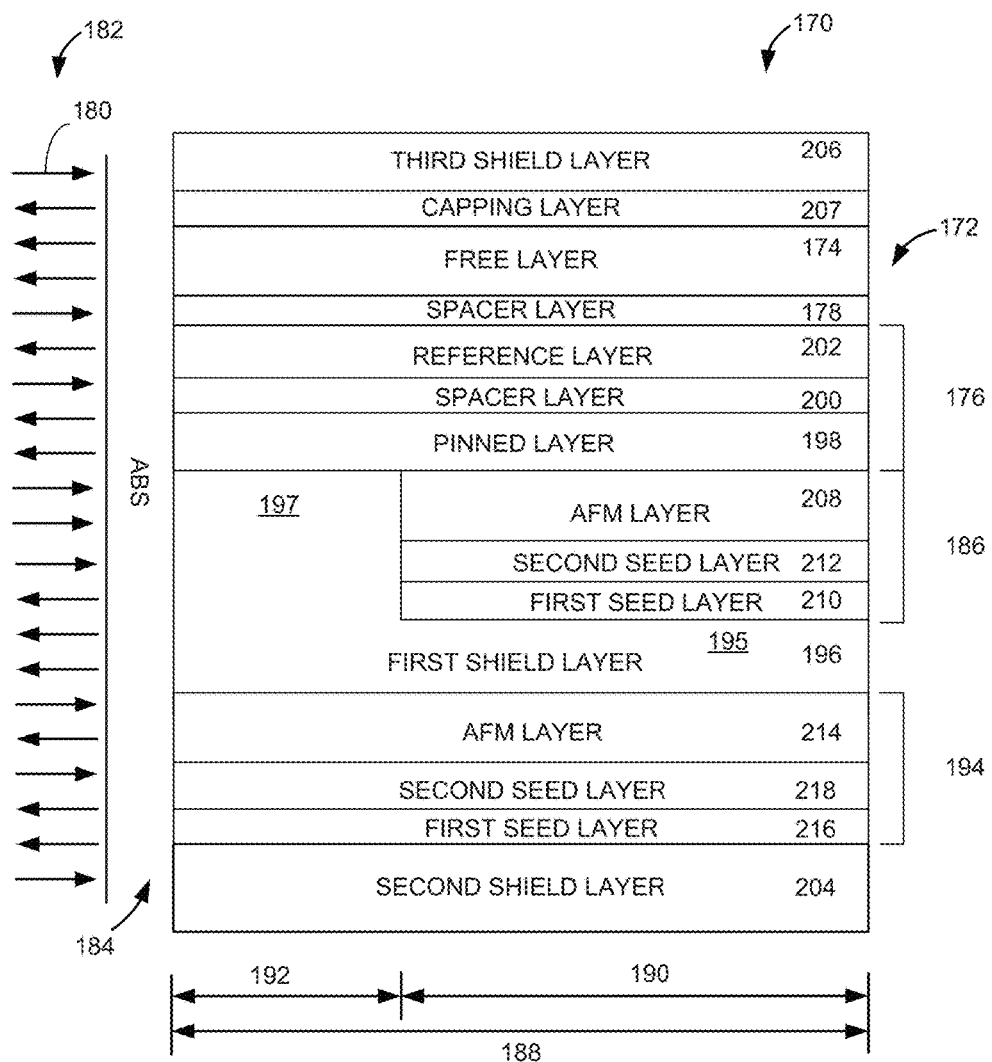
FIG. 3 is a schematic cross-section view of another embodiment of a magnetic stack.

For example, FIG. 3 is a schematic cross-section view of a magnetic stack 170. The stack 170 includes a magnetically responsive lamination 172. The lamination 172 includes a ferromagnetic free layer 174, an SAF structure 176, and a spacer layer 178 positioned between the ferromagnetic free layer and the SAF structure. The lamination 172 is separated from a sensed data bit 180 stored in an adjacent medium 182 by an ABS 184.

The stack 170 also includes a first AFM structure 186 coupled to the SAF structure 176 a predetermined offset distance 192 from the ABS 184. All of the design considerations and possibilities regarding the magnetically responsive lamination 132 and the AFM structure 146 of the magnetic stack 130 of FIG. 2 apply equally to the magnetically responsive lamination 172 and the first AFM structure 186 of the magnetic stack 170 of FIG. 3.

The stack 170 also includes a second AFM structure 194 separated from the first AFM structure 186 by a first shield layer 196. The second AFM structure 194 can include any suitable AFM structure, e.g., AFM structure 146 of FIG. 2. As illustrated in FIG. 3, the second AFM structure 194 includes an AFM layer 214, a first seed layer 216, and a second seed layer 218 positioned between the AFM layer and the first seed layer. All of the design considerations and possibilities regarding the AFM layer 164, first seed layer 166, and second seed layer 168 of the AFM structure 146 of FIG. 2 apply equally to the AFM layer 214, the first seed layer 216, and the second seed layer 218 of the second AFM structure 194 of FIG. 3. The AFM layer 214 of the second AFM 194 is coupled to the first shield layer 196.

The second AFM structure 194 can include the same layers and materials as the first AFM structure 186. Alternatively, the second AFM structure 194 can include different layers and materials from the first AFM structure 186.

As illustrated in FIG. 3, the magnetic stack 170 also includes a second shield layer 204 proximate the second AFM structure 194, and a third shield layer 206 proximate the magnetically responsive lamination 172. The second shield layer 204 is positioned such that the second AFM structure 194 is between the first shield layer 196 and the second shield layer. Any suitable material or materials can be used for the first, second, and third shield layers 196, 204, 206, e.g., materials described for first and second shield layers 154, 162 of FIG. 2. In some embodiments, the first, second, and third shield layers 196, 204, 206 include the same materials; in other embodiments, the first, second, and third shield layers can include different materials.

Similar to magnetic stack 130 of FIG. 2, the first shield layer 196 includes a region of reduced thickness 195 that houses at least a portion of the first AFM structure 186, and another region 197 that is coupled to pinned layer 198.

In the illustrated embodiment, the SAF structure 176, free layer 174, spacer layer 178, and second AFM structure 194 each extends to the ABS 184. In contrast to these layers, the first AFM structure 186 does not extend to the ABS 184. Instead, the first AFM structure 186 has a stripe height 190.

The SAF structure 176 includes a reference layer 202, a pinned layer 198, and a non-magnetic spacer layer 200 positioned between the reference layer and the pinned layer. The pinned layer 198 is proximate the first AFM structure 186 and coupled to the first AFM structure and the first shield layer 196.

The first AFM structure 186 includes an AFM layer 208, a first seed layer 210, and a second seed layer 212 positioned between the AFM layer and the first seed layer. The AFM layer 208 of the first AFM structure 186 is coupled to the SAF structure 176.

The stack 170 also includes an optional capping layer 207 positioned between the third shield layer 206 and the free layer 174. The capping layer 207 can include any suitable capping layer, e.g., capping layer 163 of FIG. 2.

Any suitable technique can be utilized to form the magnetic stacks of the present disclosure. In some embodiments, such techniques can provide a recessed AFM structure. In some embodiments, such techniques can also separate the heat treatment of the AFM structure and other parts of the magnetic stack to achieve higher pinning, higher blocking temperature of the AFM structure, and higher magnetoresistive response (MR) for the stack.

Figure 4A:
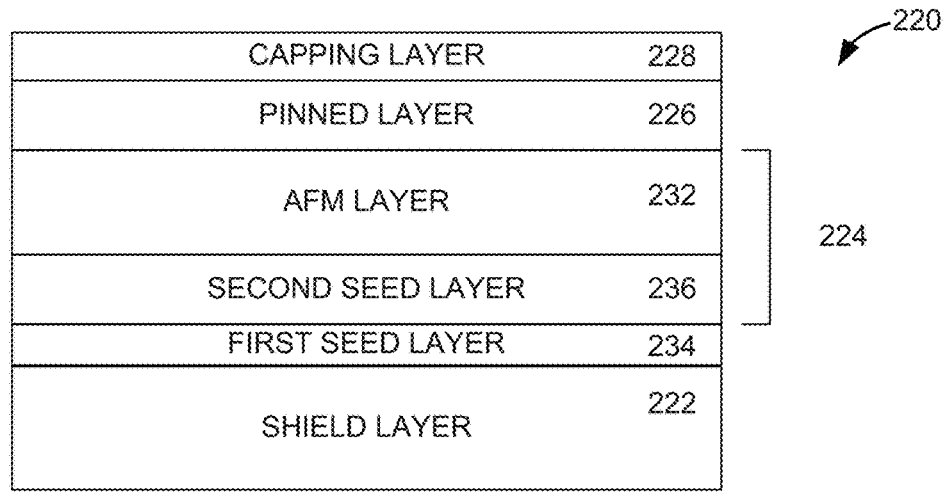
FIGS. 4A-F are schematic cross-section views of a method of forming a magnetic stack.

FIGS. 4A-F illustrate one exemplary technique for forming a magnetic stack or element (e.g., magnetic stack 130 of FIG. 2). As illustrated in FIG. 4A, a shield layer 222 is formed. Any suitable technique can be utilized to form the shield layer 222, e.g., plasma vapor deposition, chemical vapor deposition, plating, etc.

An AFM structure 224 is formed proximate the shield layer 222. In some embodiments, the AFM structure 224 is formed on the shield layer 222. In other embodiments, an additional layer or layers can be formed between the shield layer 222 and AFM structure 224. For example, in some embodiments, an additional AFM structure can be formed (e.g., second AFM structure 194 of FIG. 3) followed by forming shield layer 222 on the additional AFM structure.

In the illustrated embodiment, the AFM structure 224 includes an AFM layer 232, first seed layer 234, and second seed layer 236. Any suitable AFM structure can be formed on the shield layer 222, e.g., AFM structure 146 of FIG. 2. Further, any suitable technique can be used to form the layers of the AFM structure 224, e.g., physical vapor deposition, heater or room temperature deposition, etc.

A pinned layer 226 can be formed proximate the AFM structure 224. In some embodiments, the pinned layer 226 can be formed on the AFM structure 224. In other embodiments, an additional layer or layers can be formed between the pinned layer 226 and the SAF structure 224. In some embodiments, a capping layer 228 can also be deposited on the pinned layer 226 to protect the other layers from chemical-mechanical polishing that can be subsequently performed.

Figure 4B:
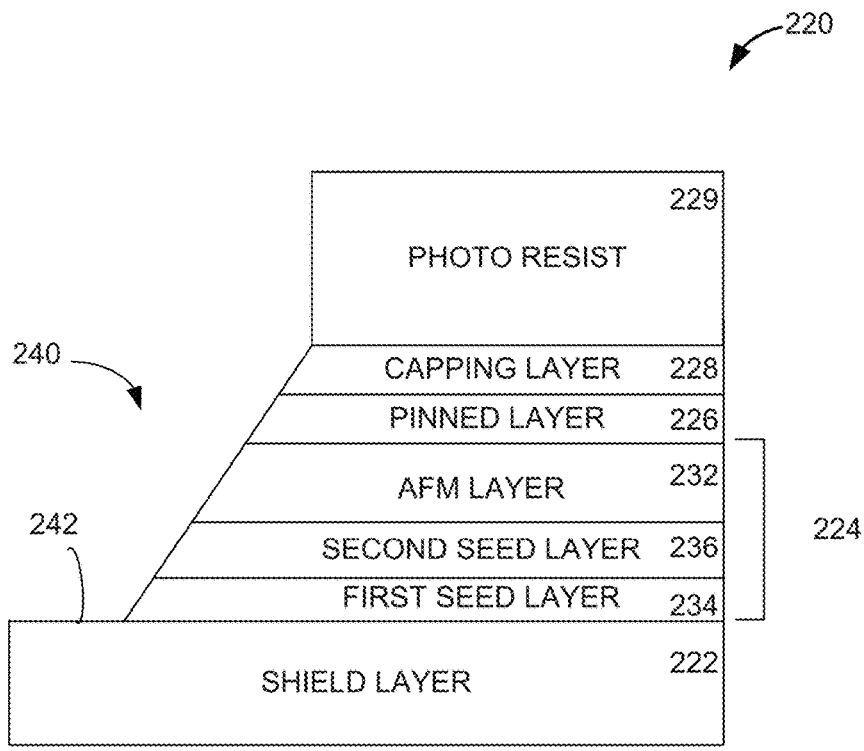

After forming the pinned layer 226 and optional capping layer 228, a photo resist layer 229 can be formed on the capping layer as shown in FIG. 4B. A portion of the pinned layer 226 and the AFM structure 224 can be removed in a region 240 of the magnetic stack 220 to expose a portion 242 of the shield layer 222. Any suitable technique or techniques can be used to expose this region of the shield layer, e.g., photolithography, ion milling, reactive ion etching, or combinations thereof. In some embodiments, a high-angle milling technique can be utilized.

Although a surface of the AFM structure 224 proximate portion 242 of the shield layer 222 has a sloped surface, in other embodiments, this surface can be substantially orthogonal to the shield layer.

Figure 4C:
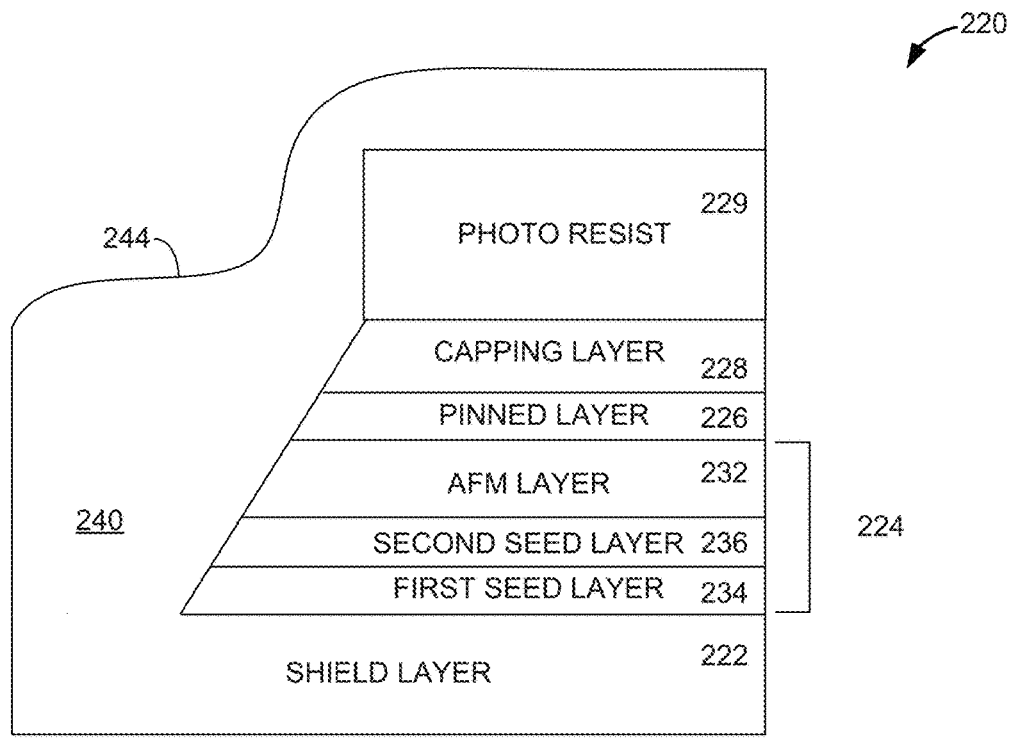

Additional shield material 244 is deposited in the region 240 of the magnetic stack 220 as shown in FIG. 4C. The additional shield material 244 backfills at least a portion of the space in the region 240 where the pinned layer 226 and the AFM structure 224 had been removed. The additional shield material 244 can include any suitable material or materials. In some embodiments, the additional shield material 244 includes the same material as the material of the shield layer 222. In other embodiments, the additional shield material 244 includes a material different from the material of the shield layer 222. Further, in some embodiments, the shield material 244 is coupled to the shield layer 222 to in effect form a unitary shield layer 222. Any suitable technique can be used to deposit the additional shield material 244.

A high-angle milling technique can be used to clear the shield material 244 from proximate the photoresist 229 so that a solvent can then be used to remove the photo resist.

Figure 4D:
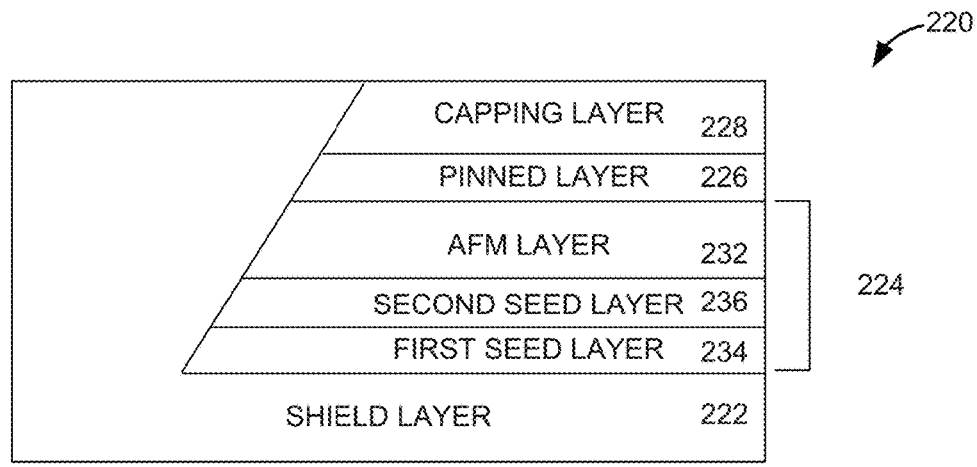

The stack 220 can be planarized to remove the photo resist 229 and excess shield material 244 as shown in FIG. 4D using any suitable technique, e.g., chemical mechanical polishing, etc. Additional techniques and steps may be performed to augment lift-off of the additional shield material, e.g., a higher angle ion milling (relative to the substrate normal, also known as a knock-off process).

Figure 4E:
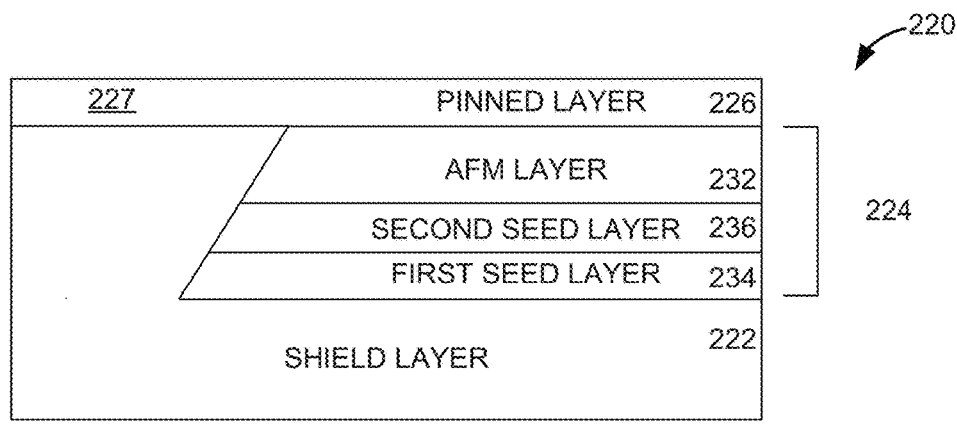

Additional pinned layer material 227 can be deposited on the shield layer 222 proximate the pinned layer 226 such that the pinned layer is extended as shown in FIG. 4E. Any suitable pinned layer material 227 can be used, e.g., the same material as the material used to form pinned layer 226. In other embodiments, the additional pinned layer material 227 can include material that is different from the material of the pinned layer 226. Any suitable technique can be used to form the additional pinned layer material 227, e.g., PVD, molecular beam epitaxy (MBE), etc. If a capping layer is present, then the layer is removed prior to depositing additional pinned layer material 229.

Figure 4F:
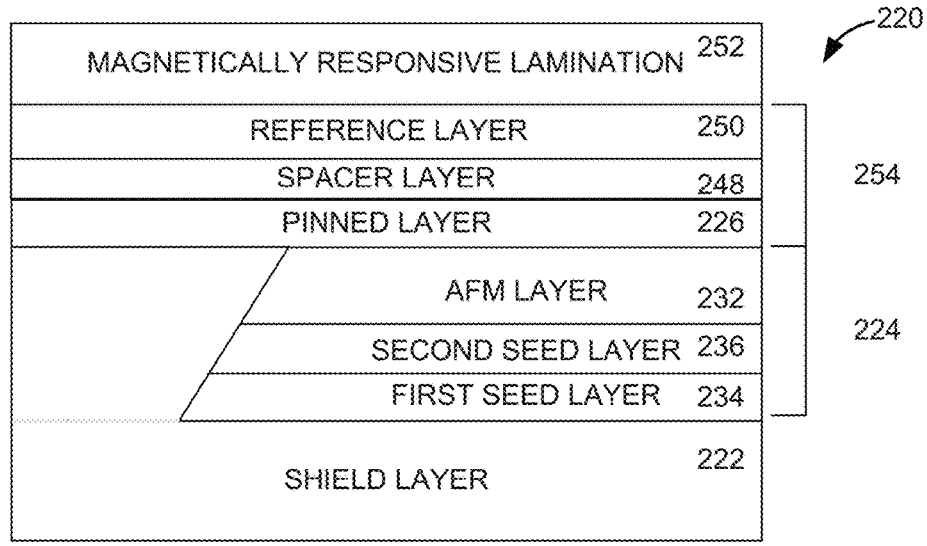

As shown in FIG. 4F, a spacer layer 248, reference layer 250, and a magnetically responsive lamination 252 can be formed proximate the pinned layer 226 using any suitable technique, e.g., PVD, MBE, etc. Further, the spacer layer 248, reference layer 250, and magnetically responsive lamination 248 can include any suitable layer or layers, e.g., the same layers as those described for stack 130 of FIG. 2. The pinned layer 226, spacer layer 248, and reference layer 250 form an SAF structure 254.

Although not shown, other layers can also be formed on stack 220, e.g., an additional shield layer on magnetically responsive lamination 252, electrode layers, etc., using any suitable techniques.

Figure 5:
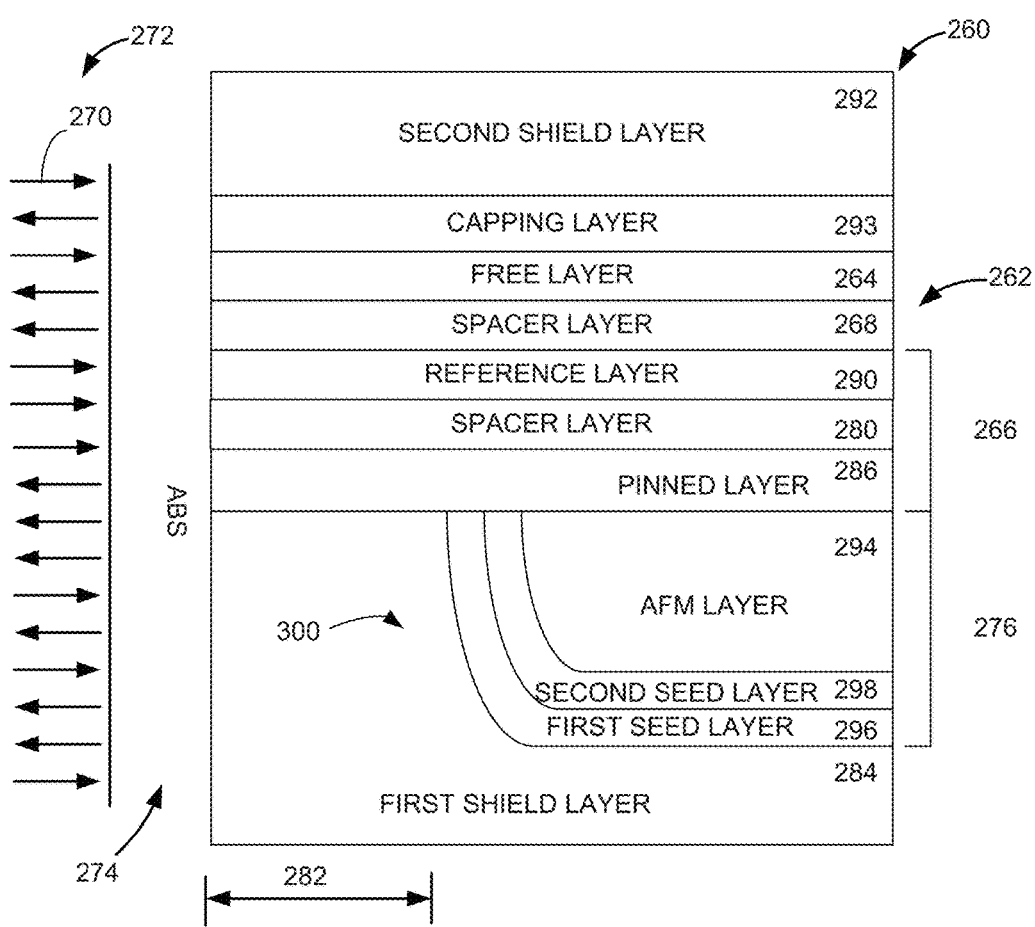
FIG. 5 is a schematic cross-section view of another embodiment of a magnetic stack.

In other embodiments, a shield layer can first be patterned to provide a recessed AFM structure instead of first forming the AFM structure and then selectively removing portions of both the AFM structure and the shield layer. For example, FIG. 5 is a schematic cross-section view of another embodiment of a magnetic stack 260. The stack 260 includes a magnetically responsive lamination 262 that includes a ferromagnetic free layer 264, an SAF structure 266, and a spacer layer 268 positioned between the free layer and the SAF structure. The magnetically responsive lamination 262 is separated from a sensed data bit 270 stored in an adjacent medium 272 by an ABS 274. The stack 260 also includes an AFM structure 276 that is coupled to the SAF structure 266 by a predetermined offset distance 282 from the ABS 274. The stack 260 also includes a first shield layer 284 proximate the AFM structure 276 such that the structure is between at least a portion of the first shield layer and the SAF structure 266.

The SAF structure 266 includes a reference layer 290, and a non-magnetic spacer layer 280 positioned between the reference layer and a pinned layer 286, where the pinned layer is proximate the AFM structure 276 and coupled to the AFM structure and the first shield layer 276. Further, the AFM structure 276 includes an AFM layer 294, a first seed layer 296, and a second seed layer 298 positioned between the AFM layer and the first seed layer. The SAF structure 266 and the AFM structure 276 can include any suitable layer or layers described herein.

Any suitable technique can be utilized to form the stack 260 of FIG. 5. For example, in some embodiments, a portion of the first shield layer 284 is selectively removed using any suitable technique, e.g., ion etching, etc., to form a recess 300. Then the AFM structure 276 is formed in the recess 300 such that it is offset a predetermined distance 282 from the ABS 274.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A method of forming a magnetic stack comprising an air bearing surface (ABS), the method comprising forming the magnetic stack, wherein forming the magnetic stack comprises:
    forming a shield layer;
    forming an AFM structure proximate the shield layer;
    forming an SAF structure proximate the AFM structure, wherein the SAF structure comprises a pinned layer proximate the AFM structure and coupled to the AFM structure;
    selectively removing a portion of the pinned layer and AFM structure in a region to expose a portion of the shield layer proximate the region;
    depositing shield material in the region, wherein the shield material is coupled to the shield layer to form a unitary shield layer;
    depositing pinned layer material on the shield material proximate the pinned layer such that the pinned layer extends into the region; and
    forming a magnetically responsive lamination proximate the SAF structure;
    wherein the magnetically responsive lamination, pinned layer, and shield layer form the ABS, and further wherein the AFM structure is disposed at a predetermined offset distance from the ABS.

2. The method of claim 1, further comprising forming a capping layer proximate the pinned layer prior to selectively removing the portion of the pinned layer and the AFM structure.

3. The method of claim 2, further comprising removing a portion of the capping layer prior to depositing the pinned layer material.

4. The method of claim 1, wherein selectively removing the portion of the pinned layer and AFM structure comprises:
    depositing a photo resist layer proximate the SAF structure; and
    selectively etching the photo resist layer, pinned layer, and AFM structure in the region to expose the portion of the shield layer proximate the region.

5. The method of claim 1, further comprising forming a second AFM structure proximate the shield layer and a second shield layer on the second AFM structure prior to forming the AFM structure, wherein the second shield layer is positioned between the AFM structure and the second AFM structure, and wherein the second AFM structure comprises an AFM layer that is coupled to the shield layer.

6. The method of claim 1, wherein the AFM structure comprises an AFM layer, a first seed layer, and a second seed layer positioned between the AFM layer and the first seed layer, wherein the AFM layer is coupled to the SAF structure.

7. The method of claim 1, wherein the SAF structure further comprises a reference layer and a non-magnetic spacer layer positioned between the reference layer and the pinned layer.

8. The method of claim 1, further comprising forming an additional shield layer on the magnetically responsive lamination.

9. The method of claim 1, wherein the SAF structure is formed on the AFM structure.

10. The method of claim 1, wherein the AFM structure is formed on the shield layer.

11. A method, comprising:
    forming a first shield layer;
    selectively removing a portion of the first shield layer to form a recess;
    forming a first AFM structure in the recess;
    forming an SAF structure proximate the first AFM structure, wherein the SAF structure comprises a pinned layer proximate the first AFM structure and coupled to the first AFM structure and the first shield layer;
    forming a magnetically responsive lamination proximate the SAF structure;
    forming a second AFM structure separated from the first AFM structure by the first shield layer; and
    forming a second shield layer proximate the second AFM structure.

12. The method of claim 11, wherein the SAF structure further comprises a reference layer and a non-magnetic spacer layer positioned between the reference layer and the pinned layer.

13. The method of claim 11, wherein the first AFM structure comprises an AFM layer, a first seed layer, and a second seed layer positioned between the AFM layer and the first seed layer, wherein the AFM layer is coupled to the SAF structure.

14. The method of claim 11, wherein the magnetically responsive lamination is separated from a sensed data bit stored in an adjacent medium by an ABS, wherein the first AFM structure is formed in the recess such that it is offset a predetermined distance from the ABS.

15. The method of claim 11, wherein the SAF structure further comprises a reference layer and a non-magnetic spacer layer positioned between the reference layer and the pinned layer.

16. The method of claim 11, further comprising forming a third shield layer proximate the magnetically responsive lamination.

17. The method of claim 11, wherein the SAF structure is formed on the first AFM structure and the first shield layer.

18. The method of claim 11, wherein the first AFM structure is formed on the first shield layer in the recess.

19. The method of claim 11, further comprising forming a capping layer on the magnetically responsive lamination.

20. The method of claim 11, wherein selectively removing a portion of the first shield layer comprises ion etching the first shield layer to form the recess.

* * * * *